Jan. 24, 1961 H. K. GILLMAN 2,969,099
APPARATUS FOR MEASURING AND SEGREGATING
SLICED PRODUCTS FROM SLICING MACHINES
Filed June 30, 1958 11 Sheets-Sheet 1

INVENTOR
HAROLD K. GILLMAN
BY
Kane, Dalsimer and Kane
ATTORNEYS

INVENTOR
HAROLD K. GILLMAN
BY
ATTORNEYS

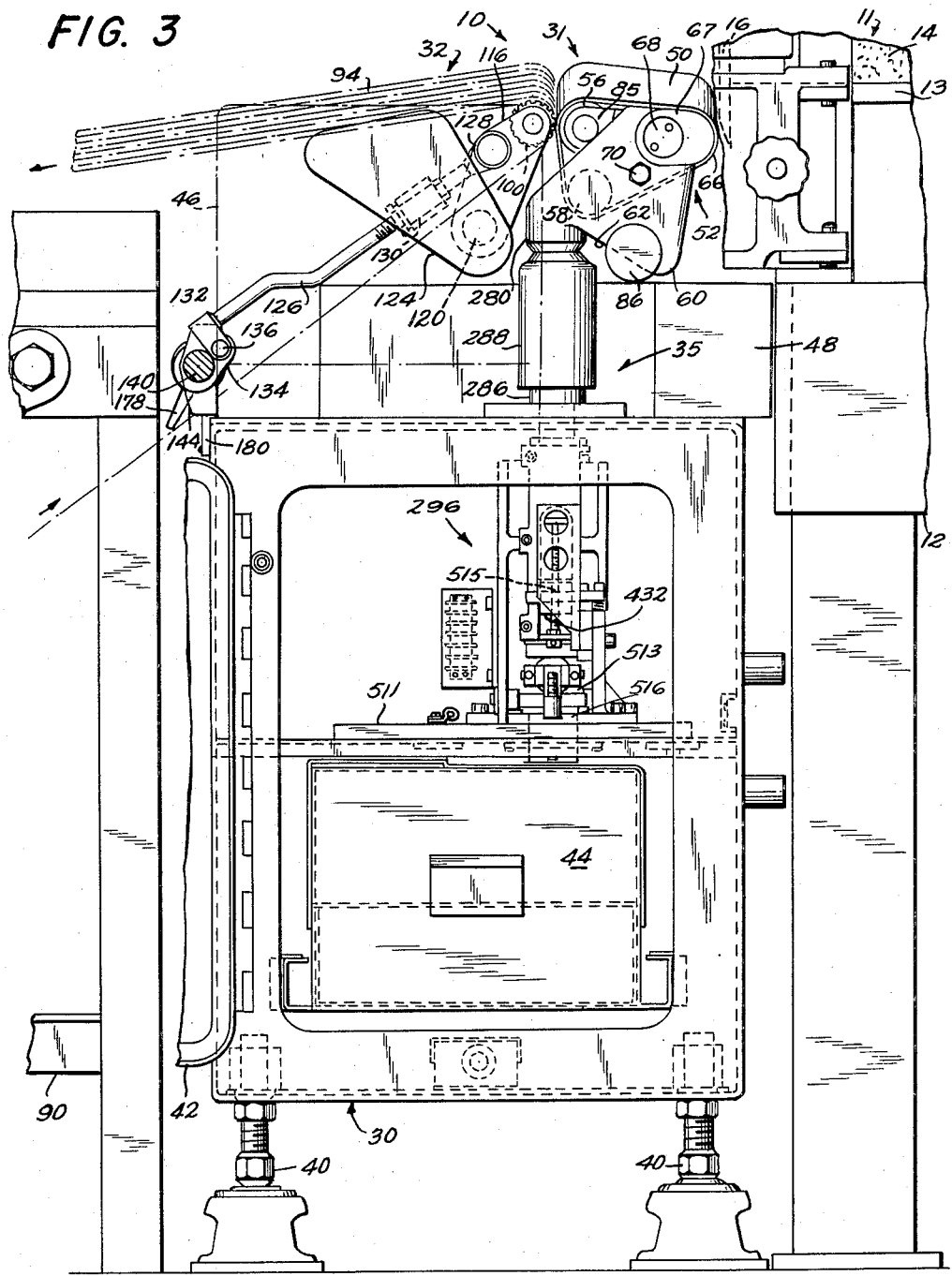

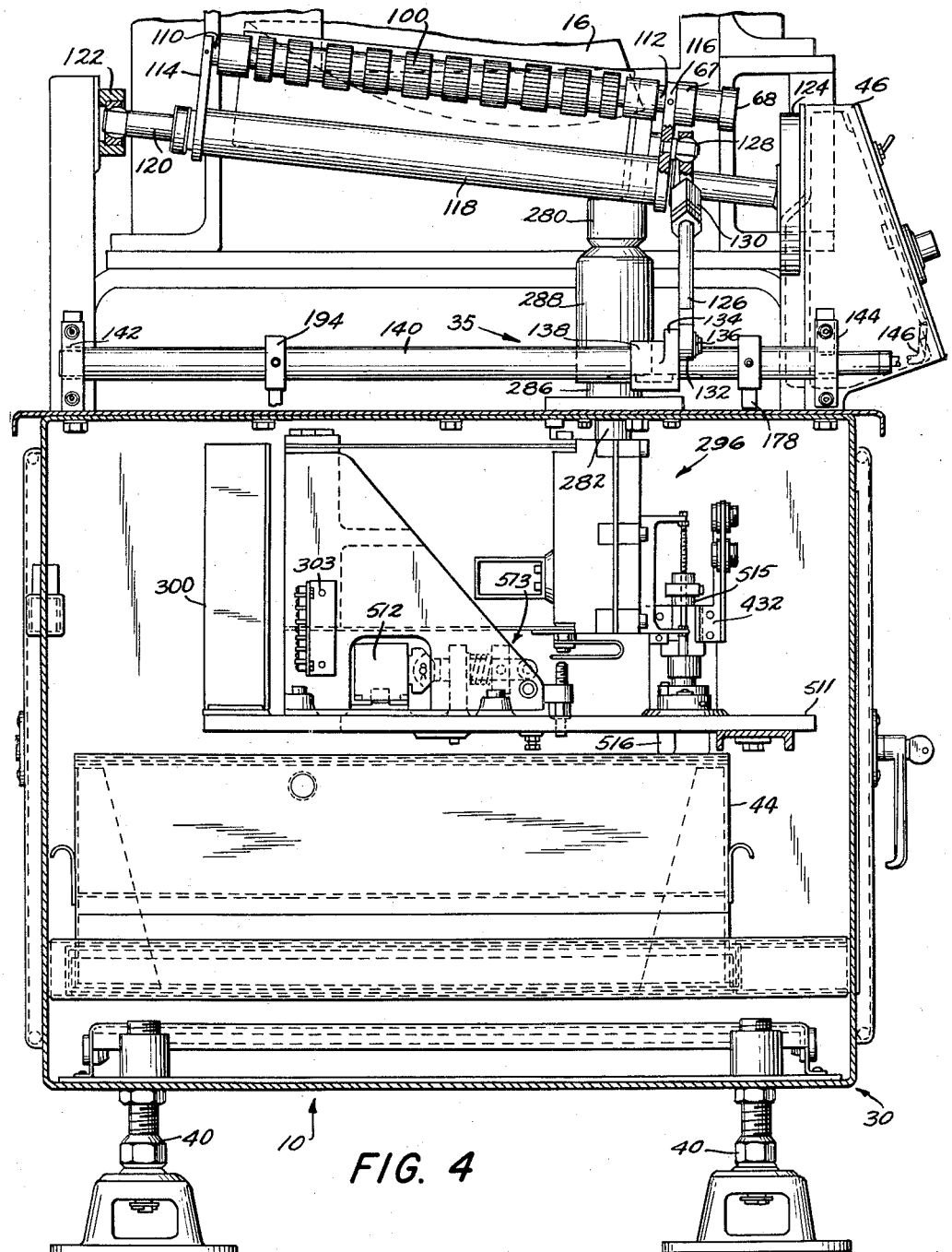

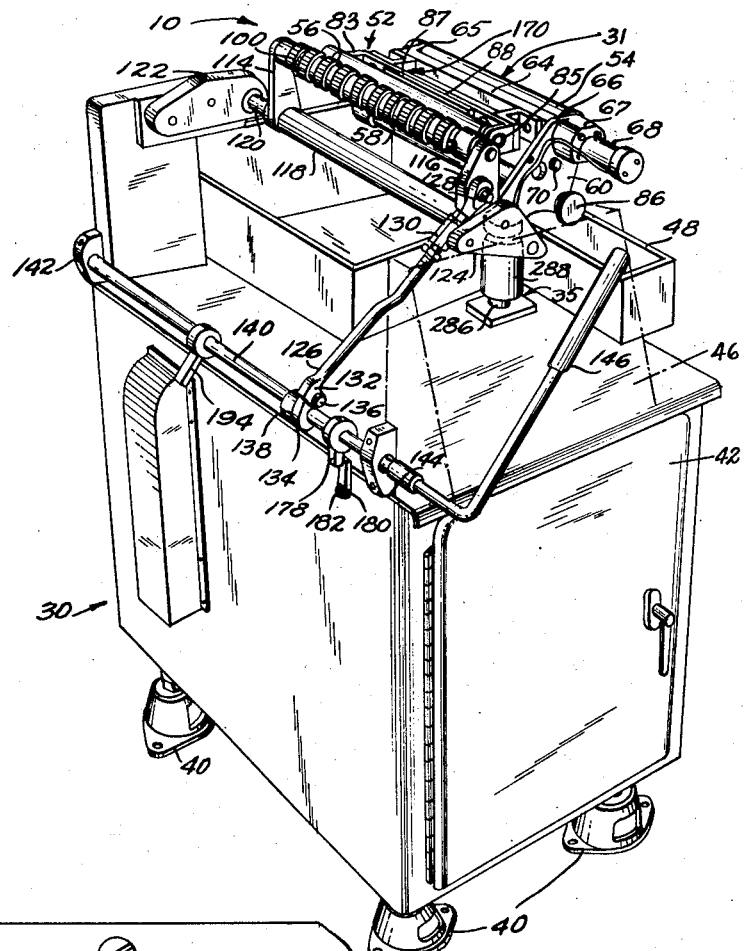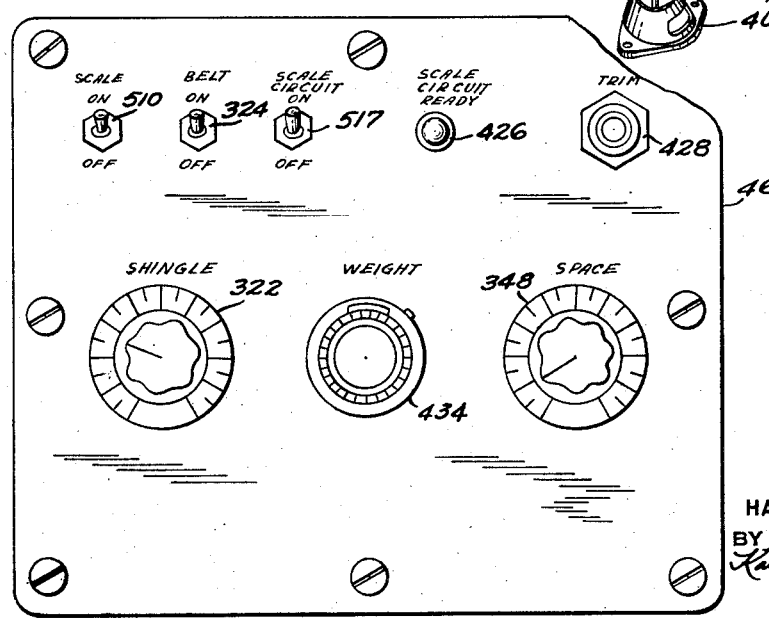

Jan. 24, 1961   H. K. GILLMAN   2,969,099
APPARATUS FOR MEASURING AND SEGREGATING
SLICED PRODUCTS FROM SLICING MACHINES
Filed June 30, 1958   11 Sheets-Sheet 6

INVENTOR
HAROLD K. GILLMAN
BY
ATTORNEYS

Jan. 24, 1961  H. K. GILLMAN  2,969,099
APPARATUS FOR MEASURING AND SEGREGATING
SLICED PRODUCTS FROM SLICING MACHINES
Filed June 30, 1958  11 Sheets-Sheet 7

INVENTOR
HAROLD K. GILLMAN
BY
ATTORNEYS

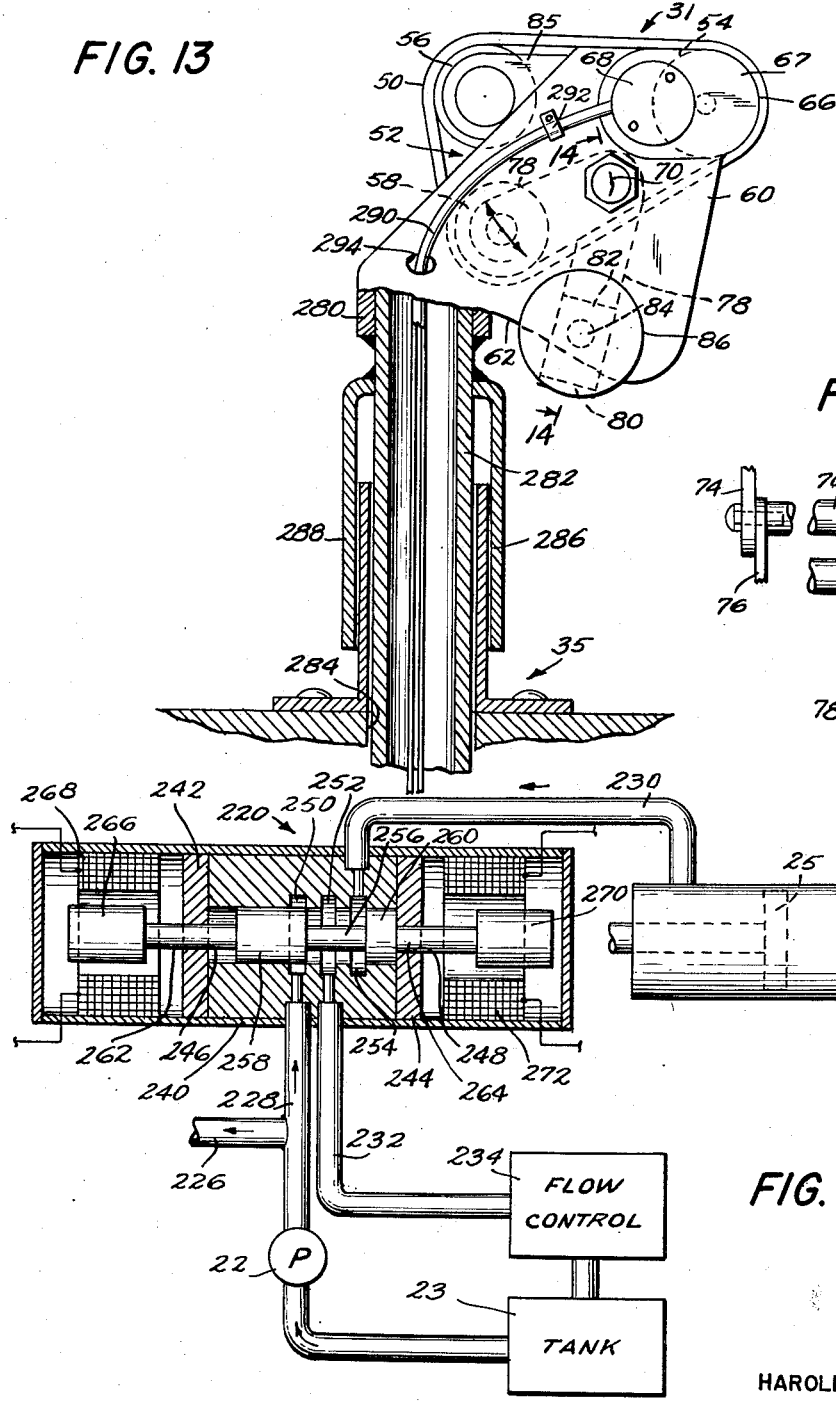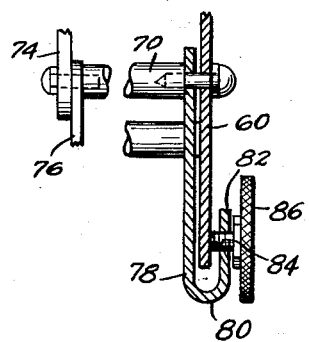

Jan. 24, 1961 H. K. GILLMAN 2,969,099
APPARATUS FOR MEASURING AND SEGREGATING
SLICED PRODUCTS FROM SLICING MACHINES
Filed June 30, 1958 11 Sheets-Sheet 9

INVENTOR
HAROLD K. GILLMAN
BY
Kane, Dalsimer and Kane
ATTORNEYS

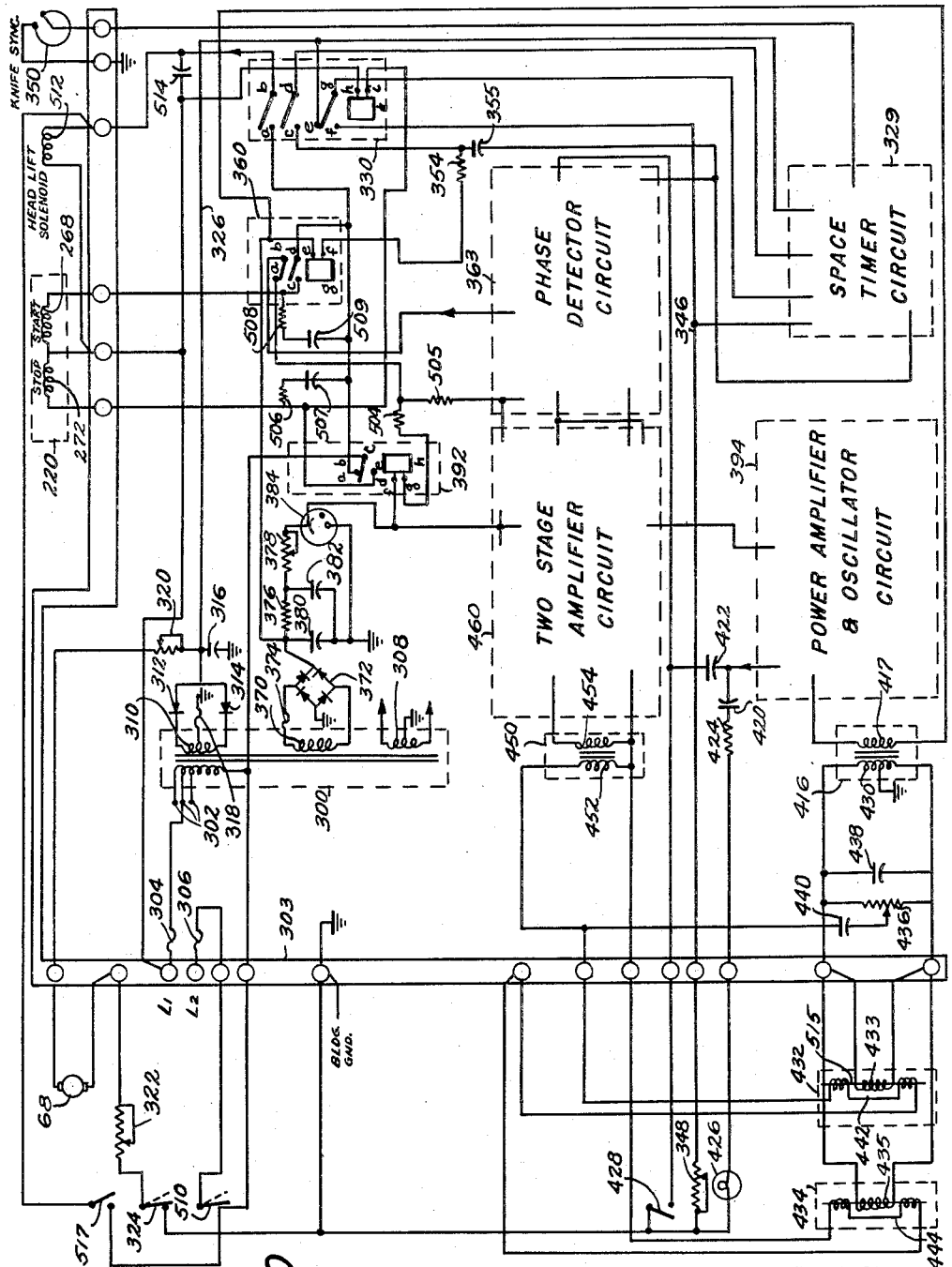

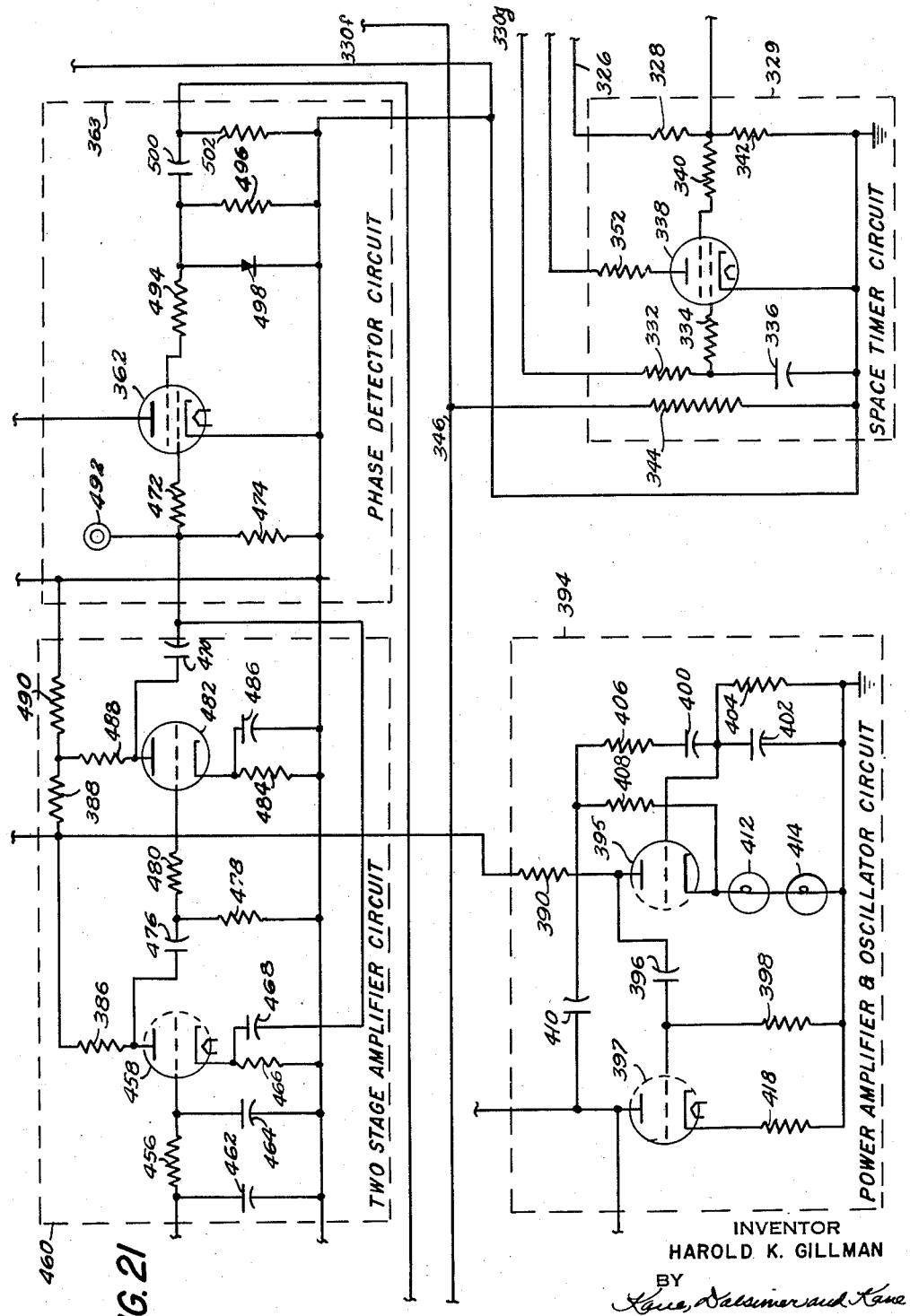

United States Patent Office 2,969,099
Patented Jan. 24, 1961

2,969,099

APPARATUS FOR MEASURING AND SEGREGATING SLICED PRODUCTS FROM SLICING MACHINES

Harold K. Gillman, Albany, N.Y., assignor to Cashin, Inc., Rochester, N.Y., a corporation of New York Filed June 30, 1958, Ser. No. 745,406

9 Claims. (Cl. 146—94)

This invention relates to an improved apparatus for measuring and segregating predetermined quantities of sliced products coming from a slicing machine, and more particularly, to an improved apparatus of the type disclosed in U.S. Patent No. 2,812,792.

It is an object of the present invention to provide such improvements, modifications and refinements in the apparatus of the aforementioned patent, and to provide improved measuring and segregating apparatus for sliced products which is flexible and which may be readily adjusted; which may be used with different types of food products; which does not interfere with the manual control of the slicing machine to which it is applied; in which the food engaging parts are accessible and can be readily cleaned; and which is of relatively simple and sturdy construction so that it is relatively simple to manufacture, assemble and use and requires a minimum amount of repair.

Another object of this invention is to provide an adjustable roller frame for interchangeable conveyor belts which are adapted to receive slices of a meat product such as bacon and the like from a slicing machine and transport this sliced product in packages of predetermined weight to a transfer belt which is shiftable to compensate for the adjusted effective length of the conveyor weigh belt.

Another object is to provide means for adjusting the effective length of a weigh conveyor associated with my measuring and segregating apparatus for purposes of minimizing the length of travel of a package of shingled meat product having a predetermined weight from slicing apparatus to a transfer belt in order that optimum production of such predetermined weight packages is obtained for apparatus embodying my invention.

A further object is to provide measuring and segregating apparatus embodying my invention with an adjustable conveyor roller frame in order that selected belt sizes can be associated with this apparatus.

A still further object is to provide improved measuring and segregating apparatus capable of handling substantially any sized bellies of bacon and the like.

Another important object is to provide improved measuring and segregating apparatus for automatically shingling and weighing either half-pound or pound units of bacon and the like.

An important object is to provide improved measuring and segregating apparatus for automatically shingling and weighing bacon and the like, irrespective of the thickness of each slice, for arriving at a predetermined weight package.

Still a further important object is to provide an improved measuring and segregating apparatus which results in lower labor costs, more uniform packaging, savings in quantity of give-away weight, neater appearance, elimination of a considerable amount of the required human element and skill for scaling, and increased premium yield.

Other important objects and advantages will become apparent from the following detailed description, which is to be taken in conjunction with the accompanying drawings, in which:

Fig. 3 is an enlarged side elevational view of my measuring and segregating apparatus, showing the trailing end of the slicing machine and leading end of a ribbon-type conveyor with which the apparatus is associated, with the scale cabinet door open and the scale control panel and adjacent structure removed and illustrated schematically in phantom;

Fig. 4 is an enlarged sectional view taken substantially along the lines 4—4 of Fig. 1, with certain parts broken away and removed;

Fig. 5 is a perspective view of a measuring and segregating apparatus embodying this invention, with the conveyor belts removed and scale control panel illustrated schematically in phantom;

Fig. 6 is an enlarged face view of the scale control panel with parts broken away and removed;

Fig. 13 is a fragmentary side elevational view of the conveyor weigh head, with certain parts broken away and illustrated in section;

Fig. 14 is a sectional view taken along the line 14—14 of Fig. 13;

Fig. 15 is a diagrammatic view of a part of the hydraulic circuit interconnecting the slicing machine and the measuring and segregating apparatus of my invention, with the double solenoid valve which cooperates to actuate the slicing machine shown in detail;

Fig. 20 is a circuit diagram of the electrical components associated with my improved measuring and segregating apparatus, with certain of the components and circuitry illustrated in block form; and Fig. 21 is a diagrammatic view of the electronic circuitry of the components illustrated in block form in Fig. 20, with their association with one another, and with the other associated components.

Figure 1:
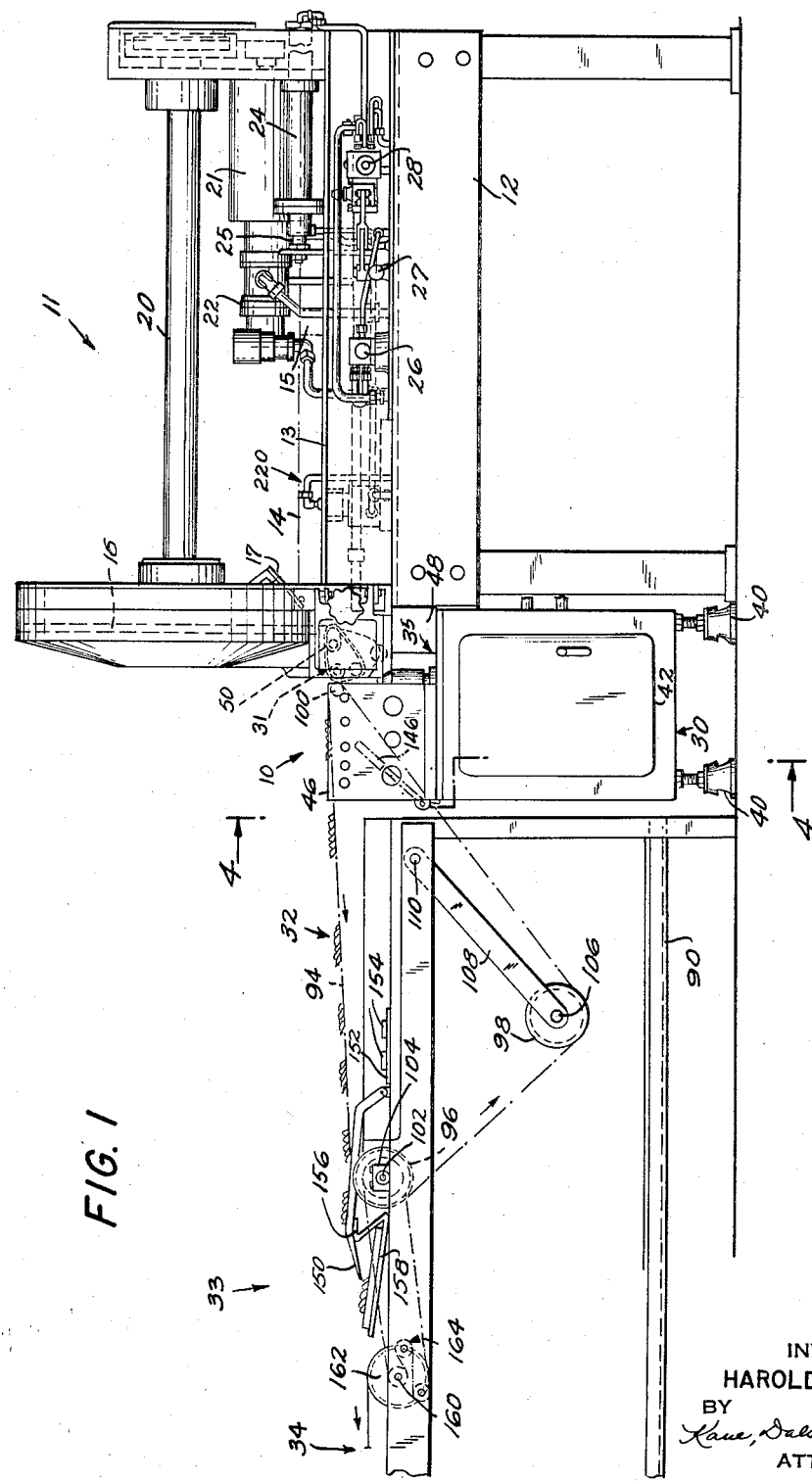
Fig. 1 is a side elevational view, partially schematic, of the measuring and segregating apparatus embodying my invention associated with a slicing machine and a ribbon type transfer conveyor, cardboard dispenser, and portions of a further conveyor.

In the accompanying drawings I have shown my improved measuring and segregating apparatus 10 applied to the discharge end of a slicing machine 11 so that the sliced products from the slicing machine are discharged on a conveyor weigh belt of my apparatus, and there measured, and the measured quantities then segregated and transferred from the other sliced products coming from the slicing machine.

Slicing machine

My improved apparatus may be used with many different types of slicing machines. The drawings illustrate one kind of slicing machine to which my measuring and segregating apparatus is particularly applicable. However, it should be understood that the illustrated slicing machine does not, per se, constitute my present invention.

Slicing machine 11 may assume the form disclosed in the aforementioned patent and may be the form of the slicing machine available commercially under the name Hydromatic Slicer which is fully disclosed in the operating instruction for the ANCO No. 827 Hydromatic Bacon Slicer (revised May 14, 1952), published by the manufacturer, The Allbright-Nell Company of Chicago, Illinois. For this reason, the slicing machine 11 will not be described in detail, and for a more complete explanation of the slicing machine, reference should be had to the aforementioned references.

Suffice it to say that the slicing machine 11 comprises a supporting table 12 having a platen or feed bed 13 over which the product such as bacon, meat loaf or luncheon meat, shown at 14, is fed by a pusher 15 to the slicing blade 16 to be sliced and then discharged onto my measuring and segregating apparatus 10.

The forward or leading edge of the meat product 14 is pressed downwardly against the bed 13 so as to properly engage the blade 16 for slicing by means of the spring pressure plate 17 suitably supported adjacent the blade 16. The blade 16 is encased in a housing 18 which serves to protect the operator and also prevent the particles of sliced product from being thrown outwardly from the blade by centrifugal force.

The blade 16 is one form of commercially available rotary cutting blade and is in the form of an eccentric disc which is rotated at relatively high speeds, such as 1350 r.p.m. and above. The portion of the blade having the greatest radius serves to slice the edge of the product, while the portion of the blade having the minimum radius provides clearance for the product to be fed outwardly, thereby permitting the initiation of the next slicing operation. The product 14 is slowly and continuously fed forwardly by the pusher 15 and each cycle of rotation of the blade produces another slice. When the pusher feeds the product 14 forwardly at a relatively high rate of speed, the thickness of the slice is increased, and when the pusher operates at a relatively lower rate of speed, the thickness of the slice is reduced.

Figure 2:
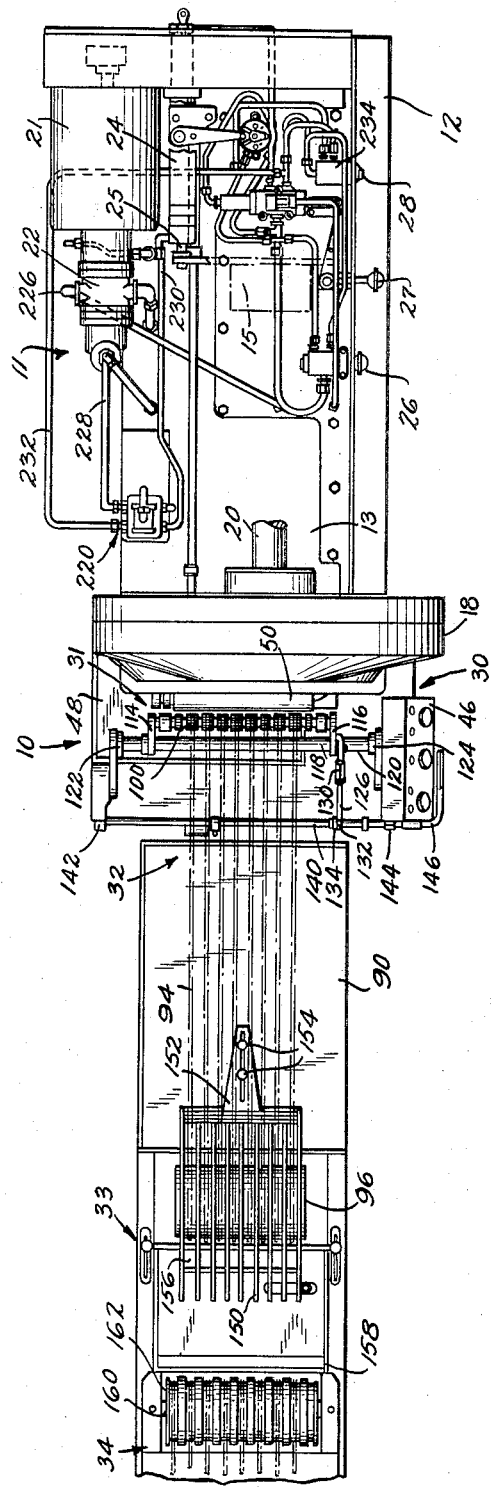
Fig. 2 is a plan view, partially schematic, of the apparatus illustrated in Fig. 1, with certain parts broken away and removed.

The blade 16 is mounted at the end of a rotatable shaft 20 and the shaft in turn may be driven by an electric motor 21 through suitable driving mechanism (not shown). Motor 21 also operates an hydraulic pump 22 (Figs. 1, 2 and 15) which provides the hydraulic fluid under pressure from a fluid supply tank 23 for the operation of the hydraulic mechanism usually associated with the slicing machine and the interconnected parts of my improved measuring and segregating apparatus 10. Reference is had to the aforementioned references for a complete description of the hydraulic circuitry normally associated with a slicing machine.

In brief, the pusher arm 15 is reciprocated by an hydraulic cylinder 24 through a piston 25 which is operatively connected to the pusher arm 15. This reciprocation is controlled by means of a control valve 26 having a handle which is adapted to be depressed and retracted to cause respectively the initiation or stopping of reciprocation of the pusher 15. Another control lever 27 is provided in the slicing machine 11 for the purpose of providing rapid traverse or shifting of the pusher 15 in either direction. A feed control dial 28 is also provided on the slicing machine for increasing or decreasing the speed of the pusher in a forward direction. Since the slicing machine does not constitute my present invention and since the illustrated slicing machine is one commercially available and known type of slicing machine, it is sufficient for our present purposes to state that the aforementioned control valve 26 is suitably connected through hydraulic tubes, fittings and valves to the actuating hydraulic cylinder 24 so that when its handle is depressed to the inward position, the cylinder's piston 25, and consequently pusher arm 15, will be caused to reciprocate, shifting to the left, as viewed in Fig. 1, so as to feed the meat product 14 forwardly to be sliced by the blade 16. When the meat product 14 has been shifted to the left so that all of it has been sliced, the piston 25 and pusher arm 15 are automatically retracted and then automatically start feeding forwardly again.

Hydraulic connections are such that by rotating the aforementioned control dial 28 in one direction, the feeding of the pusher arm 15 in a forward direction can be accelerated, and by rotating the dial in an opposite direction it can be slowed down. Additionally, by pushing the lever arm 27 in one direction, the pusher arm 15 is retracted and by shifting this lever in the opposite direction, the pusher arm is fed forwardly at an accelerated rate of speed.

The slicing machine 11 and its aforementioned hydraulic control circuitry are illustrative of the type of device to which my measuring and segregating apparatus may be applied. As stated above, the slicing machine is commercially available and does not, per se, constitute my invention.

Measuring and segregating apparatus

My improved measuring and segregating apparatus 10 comprises a supporting scale cabinet 30 on which is mounted a relatively high speed weigh conveyor 31 and the leading end of a ribbon transfer conveyor 32.

The leading end of the relatively high speed weigh conveyor 31 is positioned adjacent the discharge end of the slicing machine 11 so that the formed slices are discharged thereon. When a predetermined measured amount of the slices are accumulated on the weigh conveyor 31 they are taken by the transfer conveyor 32, which has substantially the same surface speed, to a cardboard dispenser 33, from whence the sliced package with a cardboard backing is then transferred by conveyor 34 to other stages of the desired packaging process.

Associated with the weigh conveyor 31 and the scale cabinet 30 is a scale 35 having an electronic network which will be described in detail shortly, which when the proper weight is registered, becomes energized and simultaneously stops the operation of the pusher arm 15 which feeds the meat product 14 through the knife blade 16.

The scale cabinet 30 includes adjustable legs 40 for compensating for irregularities in floor surfaces and properly leveling the scale 35. Additionally, the cabinet 30 has a hinged door 42 for permitting access to the interior of the cabinet where the majority of the components of the scale 35 are conveniently mounted, as well as the chassis 44 for its electronic network which will be described shortly. The control panel 46 for controlling and regulating the functioning and operation of the electronic network is advantageously located on the top of the scale cabinet 30. A tray 48 is suitably constructed in order that it may be positioned on the top of the scale cabinet 30 substantially beneath the knife blade 16 of the slicing machine 11, and the weigh conveyor 31, and there receive slices of the meat product 14 that may fall from the surfaces of weigh conveyor 31 and scraps of the meat product 14 that may be accumulated or produced.

As mentioned in the above, the weigh conveyor 31 is mounted on the scale cabinet 30 and is operably associated with the scale 35 which is adapted to register a predetermined weight of shingled slices of the meat product 14 received by a belt 50. It has been found to be extremely important that the effective length of the weigh belt be minimized to decrease the length of travel of a shingled package thereon. This is desirable in order that the scale 35 will be permitted to register another predetermined weight package within a minimum amount of time after registering the next preceding package of shingled meat product having a predetermined weight. However, it is additionally desirable that the weighing conveyor 31 be adjustable in order to provide flexibility in the structure of the weighing conveyor so that various weight packages can be processed through the measuring and segregating apparatus of my invention. In this connection, the weighing conveyor should be capable of receiving one-half pound shingled units, one pound shingled units, as well as other standard or arbitrary unit weight packages. Furthermore, the effective length of the weighing belt 50 should be capable of change per unit weight package in order that one may increase or decrease the effective width of the shingled package, alter the amount of overlap of the formed slices, or merely to increase or decrease a particular shingled package travel over the weighing conveyor.

Therefore, I have provided an adjustable roll assembly 52 for the weighing conveyor 31 so that it will be adapted to mount various sized weighing belts 50, the selection of which will depend upon the particular package to be processed through my measuring and segregating apparatus 10. This weighing conveyor roll assembly 52 includes a drive roll 54, a driven roll 56, and an idler or take-up roll 58.

These rolls are rotatably mounted on a frame which includes an upstanding bracket mount 60 having an inclined edge 62, the purpose of which will become apparent shortly. Extending transversely from this upstanding bracket mount 60 is an elongated bracket member 64 having a laterally projecting arm 65 which functions along with zone 66 of bracket mount 60 to rotatably mount the drive roll 54. Extending from the other face of the upstanding bracket member 60 is a motor mount 67 which supports a speed adjustable motor 68 which rotates drive roll 54 through a suitable gear train (not shown) housed in motor mount 67.

The idler roll 58 is pivotally mounted with respect to the drive roll 54, and in this regard, a rotatable pivot bar 70 is mounted by an extension 74 of bracket arm 65 and surfaces of the upstanding bracket member 60. Arms 76 and 78 extend from pivot bar 70 and rotatably mount the idler roll 58.

Arm 78 is provided with an extension 80 which is adapted to travel along edge 62 and a flange 82 overlying the exterior face of the upstanding bracket member 60 (see Figs. 13 and 14). This flange is provided with a tapped bore 84 that threadedly receives a locking screw 86 for locking the position of the idler roll 58 with respect to the drive roll bracket mount 60 and consequently the drive roll 54.

The driven roll 56 is rotatably mounted on arms 83 and 85 extending from elongated bracket member 88.

Figure 7:
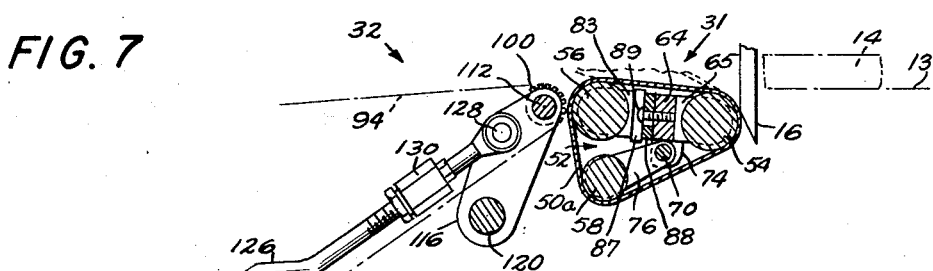
Fig. 7 is a fragmentary longitudinal sectional view of a reduced weigh conveyor shown cooperating with the trailing end of a slicing machine and further illustrating the leading end of the associated transfer conveyor.
Figure 8:
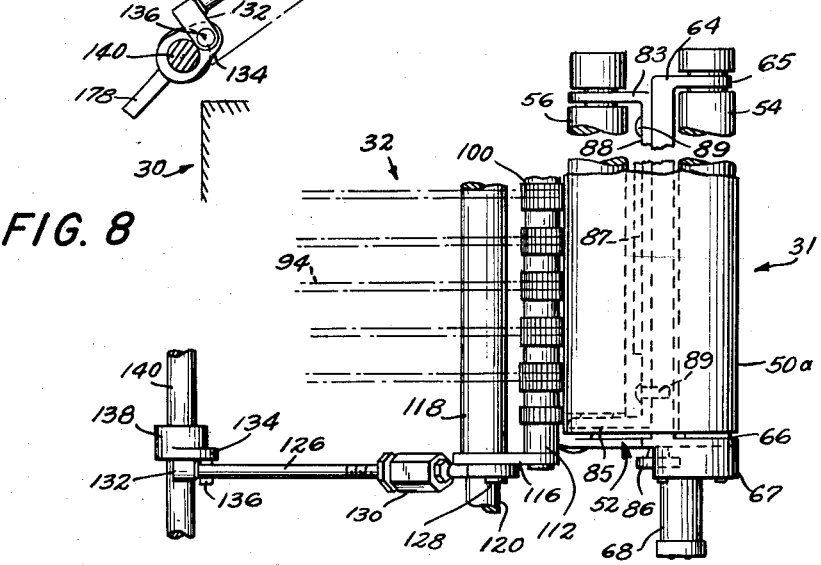
Fig. 8 is a plan view of the apparatus illustrated in Fig. 7, with certain parts broken away and removed.

In accordance with one specific form of my weighing conveyor 31 illustrated in Figs. 7 and 8, I employ for one-half pound shingled packages a 15½ inch weigh belt 50a, which has an effective upper surface length of 5½ inches. Further, this belt 50a may be formed from neoprene or other material possessing the desired characteristics for my weigh belt. In utilizing the 15½ inch belt, I couple the driven roll bracket member 88 to the driving roll bracket member 64 directly by means of bolts 89 such that plates 64 and 88 are in substantial face-to-face contact. Then, I simply slide this weigh belt 50a on the exposed faces of the rollers 54, 56 and 58, and then shift the idler roll 58 to compensate for any undesirable slack in the weigh belt 50a. This positioning of idler roll 58 is accomplished by shifting arms 76 and 78 about the pivotal axis of pivot bar 70 to the proper slack take-up position at which I lock arms 76 and 78 to the upstanding bracket member 60 by means of locking screw 86.

In order to provide rapid interchangeability of the various sized belts 50 employed for the particular weight packages selected, I prefer to set scale 35 to register, as for example, a one pound unit weight, taking into consideration the overall weight of the weighing conveyor 31, before actuating the associated electronic network and thus stop the reciprocation of pusher arm 15 and consequently the feeding of meat product 14 to the slicing blade 16. Thus, when employing a somewhat reduced sized belt 50a and its accompanying structure for one-half pound packages, suitable weights may be suspended from or placed on plate 87 suitably constructed for this purpose which is mounted on the bracket member 88 of the weighing conveyor structure so as not to interfere with the functional parts thereof while compensating for the reduced weight of the weighing conveyor structure as compared to a heavier weighing conveyor structure employed as a standard in setting the scale 35. For example, this standard weight for a weighing conveyor structure may be the weight incident to the relatively large weighing conveyor structure that will be described shortly in connection with the form of weighing conveyor illustrated in Figs. 11 and 12. It is to be understood that the scale 35 may be preset by utilizing any sized weighing conveyor as a standard, and it is my intention that this invention not be limited to the use of the weight of the form of weighing conveyor illustrated in Figs. 11 and 12 as a standard for the aforementioned purpose.

It will be observed that the various axes of rotation of the rolls of the weighing conveyor assembly, as well as the plane of the shingle receiving surface of the weighing belt 50 are all at an angle with respect to the horizontal. This inclination is desirable to compensate for the throw of the slices made by the knife blade 16 and thus prevent sliding of the formed slices on the upper face of the selected weighing belt 50.

After the shingled packages have been weighed, such as the one-half pound packages incident to the employment of the 15½ inch weighing belt 50a, they are transported to the transfer conveyor 32 by the weighing conveyor 31. This transfer conveyor 32 has a major portion thereof supported by table 90 which also functions to support the cardboard dispenser 33 and conveyor 34. This transfer conveyor 32 comprises a plurality of high speed spaced parallel endless belts 94, such as the chain or ribbon type formed from the proper material to be employed in connection with my invention. These belts 94 are mounted on rotatable spaced pulleys 96 and 98, as well as a porcupine roll 100. The pulleys 96 are mounted on a shaft 102 which is suitably journaled in upstanding brackets 104 extending from the top of table 90. The pulleys 98 are similarly mounted upon a shaft 106 which is mounted for rotation on the lower end of a pair of substantially similar downwardly extending elongated plates 108. The upper ends of these plates 108 are mounted upon a shaft 110 which is suitably journaled in the under-side of the top of table 90. Since the elongated plates 108 are free to pivot with respect to the table 90, the pulleys 98 will take up any undesirable slack in the conveyor belts 94 when the axis of porcupine roll 100 and shaft 102 are selected.

Referring now to the porcupine roll 100, it will be observed that this roll is preferably and advantageously located adjacent the trailing end of the weighing conveyor 31 and similarly inclined with respect to the horizontal. Roll 100 is suitably supported by the scale cabinet 30 so that it is capable of shifting and thus increasing or decreasing the effective length of the transfer conveyor 32 to compensate for any change in the effective length of the weighing conveyor 31. The ends 110 and 112 of porcupine roll 100 are journaled in arms 114 and 116 respectively, which, in turn, extend from a tubular sleeve 118 mounted on a shaft 120. Shaft 120 is journaled in brackets 122 and 124 by means of suitable bearings substantially as shown. Bracket 124 is located adjacent the rear of control panel 46 and is suitably supported by the top of scale cabinet 30, whereas bracket 122 is similarly supported at a position distal control panel 46.

A pusher rod 126 is pivotally mounted on the outer face of arm 116 by means of a bearing 128. The pusher rod 126 is fabricated in two sections which are coupled together by a nut 130 which also serves to adjust the effective length of this rod. The other end of pusher rod 126 is provided with a laterally extending projection 132 pivoted eccentrically on arm 134 by means of a pin 136. Arm 134 extends from a sleeve 138 which is fixed to shaft 140. One end of shaft 140 is journaled in bracket 142 secured to the upstanding bracket 122. The other end of shaft 140 is journaled in bracket 144 which extends from control panel 46. This end of shaft 140 extends through bracket 144 and is securely coupled to a handle 146. Thus, by shifting handle 146, the shaft 140 will rotate and thus shift the porcupine roll 100 with respect to the weigh conveyor 31 through the pivoting of arms 114 and 116 about the axis of shaft 120.

The cardboard dispenser 33 includes a plurality of hinged fingers 150 interdigitated between the belts of transfer conveyor 32. These fingers are hinged to a plate 152 resting upon the upper surface of table 90 and being secured thereto for longitudinal adjustment by means of a series of bolts 154. Plate 152 is provided with elongated recesses for permitting the passage of the bolts 154 upon shifting of the plate 152 with respect to the table top. The terminal ends of the fingers 150 rest upon a laterally-extending flange 156 of a cardboard support 158. The shingled packages of predetermined weight are transferred to the fingers 150 by the transfer conveyor 32 and are then manually shifted by the operator onto a cardboard backing sheet from the cardboard dispenser 33. The shingled package, with its cardboard backing, is then transferred to the conveyor 34 and then transported to other stations to complete the packaging process for the shingled meat product.

The conveyor 34 is driven by a motor (not shown) located at the other or downstream end of table 90. Shaft 160, which mounts pulleys 162 of conveyor 34, transmits this movement to transfer conveyor 32 through a sprocket and gear system 164. The surface speed of transfer conveyor 32 should be substantially equal to the surface speed of weigh conveyor 31 in order that the shingled packages will not be torn apart in transferring this package from one conveyor to another. This is accomplished by synchronizing the output of motor 68 and the motor (not shown) that directly drives conveyor 34 and ultimately conveyor 32 through system 164.

Referring now back to the reduced weigh conveyor belt 50a, as illustrated in Figs. 7 and 8, it will be observed that the handle 146 is shifted to such a position that the lateral extension 132 of pusher rod 126 bears against surfaces of shaft 140. In this position, the axes of shaft 140, pin 136 and bearing 128 may be said to be substantially in the same plane. When the parts are in this position, the porcupine roll 100, with its mounted segments of belts 94, are disposed substantially adjacent surfaces of weigh belt 50a. Further clockwise movement of arm 134 will be prevented by the bearing of projection 132 on shaft 140. A deliberate counterclockwise movement of this arm 134 is essential to shift the pusher rod 126. Consequently, for all intents and purposes, the porcupine roll 100 of this embodiment has a substantially fixed axis of rotation.

Figure 9:
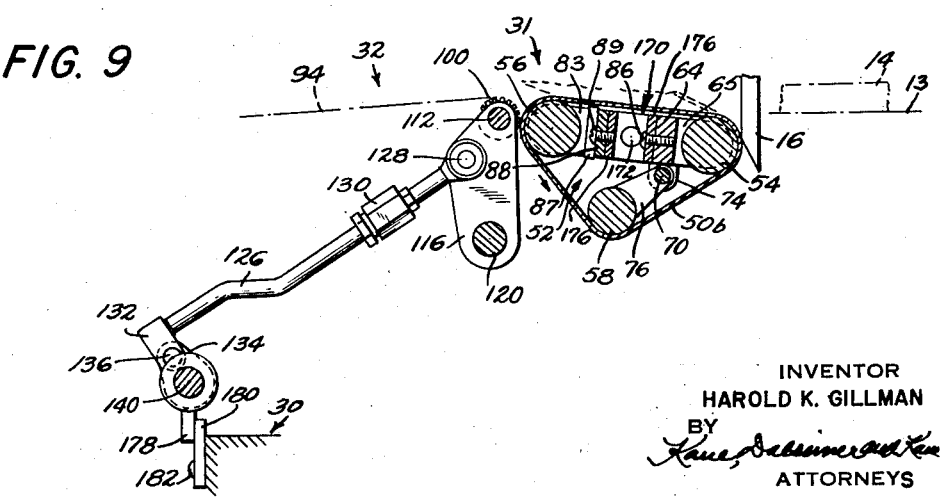
Fig. 9 is similar to Fig. 7 and illustrates a somewhat enlarged weigh conveyor and its association with the trailing end of a slicing machine and leading end of a transfer conveyor.
Figure 10:
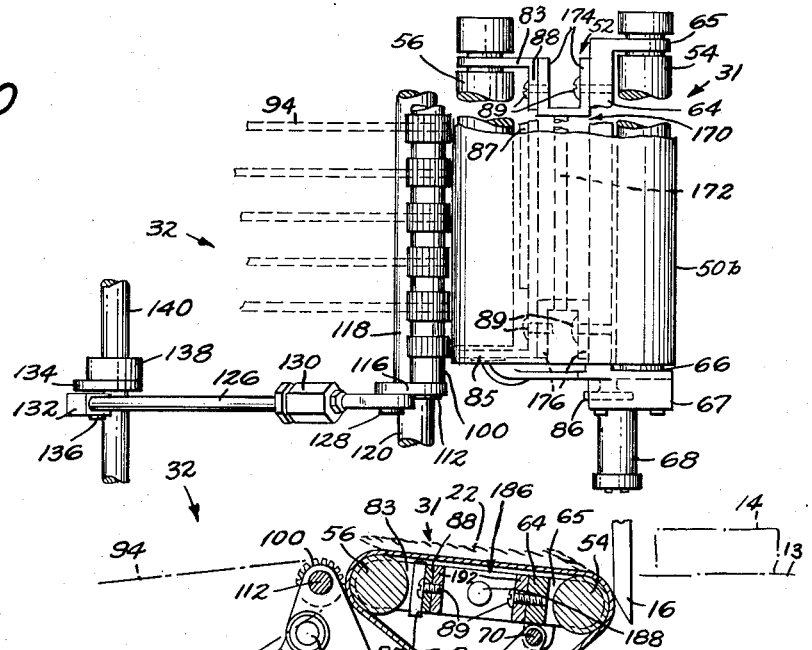
Fig. 10 is a plan view of the apparatus illustrated in Fig. 9, with certain parts broken away and removed.

In Figs. 9 and 10, I illustrate a weighing conveyor 31 of increased size having an effective length larger than that of the endless belt 50a associated with the embodiment illustrated in Figs. 7 and 8. For one pound shingled packages, I may employ a belt 50b having an overall length of approximately 18¼ inches, with an effective length of 7½ inches. This particular belt 50b has been found to result in optimum output for a package, such as a one pound package of bacon having twenty-two slices per pound. In employing this belt 50b, adjustment of the axis of drive roll 54 and driven roll 56 is necessary, together with a subsequent adjustment of location of the idler roll 58. In accomplishing the adjustment of weigh conveyor 31, I preferably employ a filler 170 which includes an elongated bar 172 terminating at its ends into bifurcated projections 174 and 176. The filter 170 is interposed between the inner side faces of plate 64 and 88 and secured to these members by means of a series of bolts 89. Obviously, the idler roll 58 is shifted to take up slack in belt 50b and secured to bracket member 60 by locking screw 86 to be disposed substantially as shown in Figs. 9 and 10. Again, suitable weights can be mounted on plate 87 to arrive at the standard weigh conveyor weight represented by the embodiment of Figs. 11 and 12.

As a result of the increased effective length of the subject conveyor belt 50b, the porcupine roll 100 must be shifted to a retracted position. This is accomplished by pivoting the projection 132 by means of handle 146 in a counterclockwise direction with respect to shaft 140 to a position substantially as illustrated in Figs. 9 and 10. A lever 178 is suitably mounted on shaft 140 and is adapted to engage the outer face of a shiftable lug 180 pivoted to the scale cabinet 30 by a pin 182. Thus, arm 134 is arrested and prevented from further counterclockwise movement, thereby positioning porcupine roll 100 at the desired location with respect to the trailing end of weighing conveyor 31 having the selected dimensions such as the above-defined lengths of 18¼ inches and 7½ inches. Clockwise movement of arm 134 is insured against by the disposition of the pivotal axis of pin 128 with respect to porcupine roll 100 and shaft 120 and resisted by the force of gravity acting on pulleys 98 and arms 108.

Figure 11:
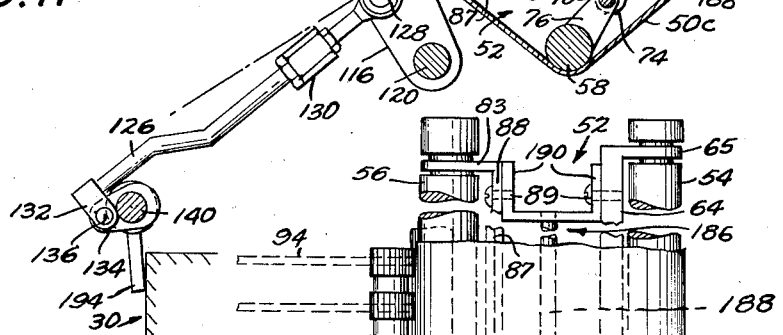
Fig. 11 is similar to Fig. 9 and illustrates a conveyor weighing belt still further enlarged, with associated slicing machine elements and transfer conveyor mechanism.
Figure 12:
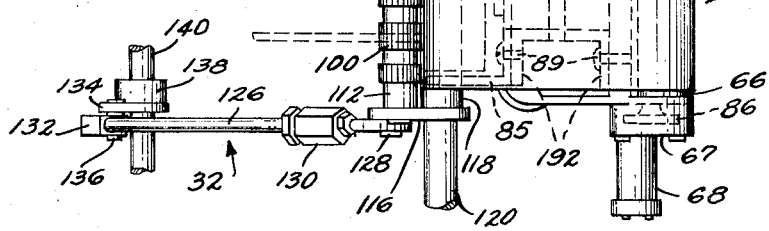
Fig. 12 is a plan view of the apparatus illustrated in Fig. 11, with certain parts broken away and removed.
Figure 16:
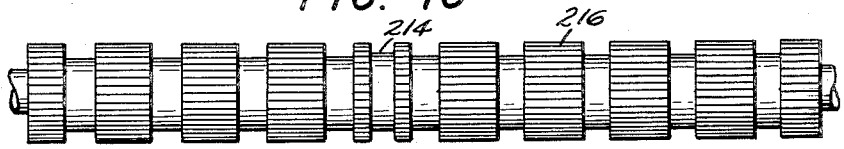
Figs. 16 to 19 illustrate a modified porcupine roll and weigh belt to be employed with this invention as an embodiment particularly suitable for use with relatively thin meat products such as thin bacon bellies.
Figure 17:
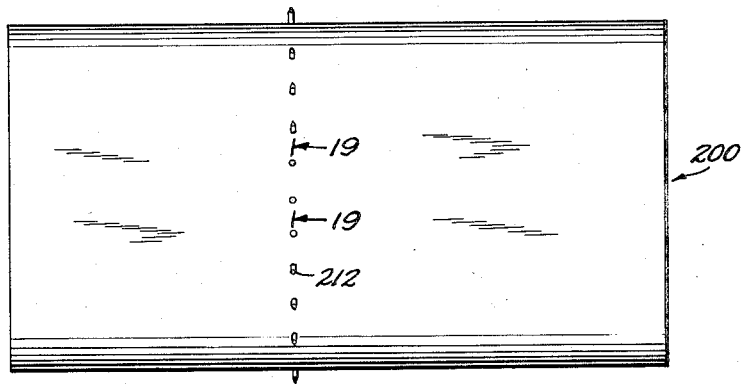
Figure 18:
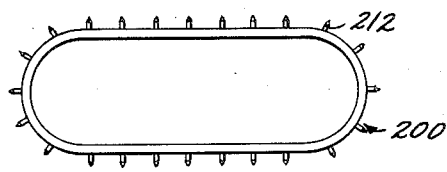
Figure 19:
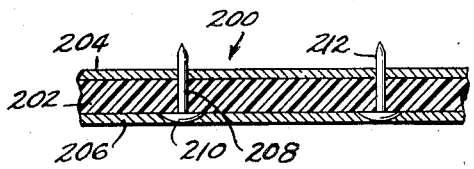

In Figs. 11 and 12, a further embodiment of a weighing conveyor 31 is illustrated. For purposes of this disclosure, the weighing conveyor of these figures represents the structure establishing the standard weight to be compensated for in setting the scale 35 to measure shingled packages of the meat product 14. The belt 50c of the subject weighing conveyor is roughly 20 inches long, having an effective traveling length of 8½ inches and is adapted to receive, from the slicing machine 11, slices possessing a decreased amount of overlap for a one pound package. To properly mount the weigh belt 50c having the above-defined characteristics, I employ a filler 186 to the weigh conveyor structure illustrated in Figs. 7 and 8. This filler 186 is substantially the same as the filler 170 illustrated in the embodiment in Figs. 9 and 10. In this connection, filler 186 includes an elongated bar 188 having bifurcated end portions 190 and 192. These end portions are connected to plate 64 and 88 by means of bolts 89 substantially as shown and in a manner similar to the structure of Figs. 9 and 10. The belt 50c is fitted over drive roll 54 and driven roll 56. The idler roll 58 is then shifted downwardly to take up the slack present in the belt 50c. The locking screw 86 is loosened to permit this shifting and subsequently tightened to secure arm 78 to bracket member 60. As a result of the relocation of the trailing end of the weigh conveyor 31, the porcupine roll 100 must again be shifted. Lug 180 is pivoted about pin 182 either in a clockwise or counterclockwise direction to free lever 178 and thus permit further counterclockwise movement of arm 134. A second lever arm 194 is fixed to shaft 140 and is of somewhat increased length. Lever arm 196 is also displaced angularly with respect to lever 178, which is now permitted to clear lug 180 as well as the top of scale cabinet 30. Lever arm 194 will engage surfaces of this cabinet 30 upon counterclockwise rotation of shaft 140 and thus position projection 132 relative to arm 134 in the manner illustrated in Fig. 11, thereby causing the pusher rod 126 to retract the porcupine roll 100 about the pivotal shaft 120. Obviously, numerous lever arms could be coupled with shaft 140 to arrive at predetermined positions for the porcupine roll 100, depending upon the size and effective length selected for weighing belt 50.

Difficulty may be encountered in maintaining very thin slices of a particular meat product 14, such as bacon, on a weigh belt 50. In this connection, it may be found that when attempting to slice relatively thin bacon bellies, the speed of the knife 16 has a tendency to throw the thin shingles across the weigh belt 50 into the scrap pan 48. To prevent such undesirable consequences and with specific reference to Figs. 16 to 19, a laminated weigh belt 200 is advantageously utilized having a center layer 202 of nylon encased by layers 204 and 206 formed from neoprene. Obviously, other combinations of materials can be employed in accomplishing the desired end results. A series of pins or tacks 208 are then located along the center line of the composite weigh belt 200, with the head 210 of these pins interposed between layer 202 and layer 206. The pointed ends 212 of these tacks extend through layers 202 and 204 and are exposed along the outer face of weigh belt 200. In providing relatively close tolerance between the trailing end of the weigh conveyor 31 and the leading edge of transfer conveyor 32, I provide a circumferentially extending groove 214 in the outer face of porcupine roll 216, which is otherwise similar to roll 100, thereby providing the necessary clearance for the exposed ends 212 of pins 208.

As mentioned in the foregoing, the movement of pusher arm 15 is stopped when the scale 35 registers a predetermined weight of meat product 14 upon the weighing conveyer 31. In the above-identified type of slicing machine 11, pusher arm 15 is reciprocated by a piston rod extending from the piston 25 which is displaceable in an hydraulic cylinder 24. To arrest the movement of pusher arm 15 until it is desired to initiate again the slicing of the meat product 14, I preferably employ a double solenoid valve assembly 220 which functions to equalize the pressure on both faces of the piston 25, thereby stopping the displacement of this piston within the hydraulic cylinder 24.

The fluid normally employed for the hydraulic circuits of the subject slicing machines is supplied by a tank or reservoir 23 by means of a pump 22 through main supply line 226. The double solenoid valve assembly 220 is tapped into this main supply line 226 by a line 228. During the normal slicing cycle, when pusher arm 15 is displacing the meat product 14, the hydraulic fluid passes through the hydraulic circuits of the slicing machine 11, and through line 230 which communicates with the forward part of cylinder 24 and front face of piston 25. The fluid passing through line 230 is adapted to flow through the double solenoid assembly 220 into line 232 having the usual flow control valve 234 and ultimately into tank 23.

During the meat product slicing cycle, the double solenoid valve 220 functions to close the passage provided by line 228, thereby preventing the pressurized fluid from communicating with line 230 and the forward part of the hydraulic cylinder 24. When a predetermined weight is registered by the scale 35, the electronic network to be described subsequently energizes the double solenoid valve assembly 220 in such a manner that a passage will be provided in the valve assembly 220 that will afford communication of line 228 with line 232, thereby providing access for the pressurized fluid flowing from pump 22 to the tank 23 through valve assembly 220. Simultaneously therewith the line 230 will be sealed by parts of the valve assembly 220, thereby stopping further movement of piston 25 and consequently the forward movement of pusher arm 15.

The double solenoid valve assembly 220 comprises housing 240 having a pair of partitioned end walls 242 and 244, each having a centrally located bore 246 and 248, respectively. The portion of the casing 240 disposed between end walls 242 and 244 is hollow and is provided with internal circumferentially extending recesses 250, 252 and 254. Recess 250 communicates with line 228, recess 252 communicates with line 232, and recess 254 communicates with line 230. The spool 256 is displaceable within housing 240 and is provided with piston members 258 and 260 which neatly and slidably embrace the internal walls of housing 240. The outer ends of the piston members 258 and 260 have extending therefrom rods 262 and 264, respectively, which extend through the bores provided in end walls 242 and 244. The outer exposed ends of rods 262 and 264 are then coupled with an armature 266 displaceable by solenoid 268, and armature 270 displaceable by solenoid 272, respectively. The displacement of pistons 258 and 260 in housing 240 with respect to the internally formed recesses is such that when solenoid 268 is energized to thereby displace armature 266 to the right, as viewed in Fig. 15, piston 258 will seal off the entry of the fluid under pressure in line 228 to the recesses 252 and 254, and consequently lines 232 and 230, respectively. The fluid in line 230 will now be permitted to pass through the interior of housing 240 into line 232. This particular position of the double solenoid valve assembly 220 is present during the normal slicing cycle of the slicing machine 11. When the scale 35 registers a predetermined weight, the solenoid 272 will become energized through the electronic network to be described shortly, thereby displacing armature 270 to the left. Piston 260 will then seal the passage for hydraulic fluid provided in line 230 and facilitate the passage of the fluid under pressure in line 228 through the interior of the housing 240 into line 232. The fluid under pressure in line 230 being substantially incompressible, will prevent further forward movement of the piston 25 in cylinder 24, thereby stopping the forward feeding of the meat product 14 by the pusher 15 to the knife blade 16.

The upstanding bracket member 60 has lower portions thereof extending into a tubular sleeve 280 that is securely mounted on a hollow tubular spindle 282 (see Figs. 3, 4 and 13). Spindle 282 projects through an opening 284 in the top of scale cabinet 30 and is maintained in a substantially upright position by means of a tubular bracket 286 bolted down to the cabinet 30. A tubular apron 288 is secured to the spindle 282 and surrounds the outer face of bracket 286. The electrical leads 290 for motor 68 are suitably anchored at 292 to the outer face of bracket member 60 and are then passed through opening 294 into the interior of spindle 282. Sufficient clearance is provided between spindle 282, bracket 286 and apron 288 to minimize drag during the weighing operation and thus substantially lessen erroneous weight readings. Spindle 282 is coupled with the conveyor scale or weigher head assembly 296, which is of a type that is commercially available and described in the instruction manual for the Electronic Baconweigher (revised January, 1958) published by the manufacturer, Wright Machinery Company of Durham, North Carolina. Therefore, a complete description of all of the specific structural features of this weigher head assemby 296 will not be entertained and for a complete explanation of this assembly, reference is now made to the manufacturer's instruction manual. However, certain structural components will be mentioned in connection with the following description of the electronic network associated with my improved measuring and segregating apparatus.

*Electronic network*

When tapping into an A.C. power source, all power for the electronic circuits is supplied by a transformer 300 with multiple primary taps 302 for different house voltages supplied to incoming power terminals L–1 and L–2 on terminal strip 303. The taps from terminals L–1 and L–2 are respectively suitably fused by fuses 304 and 306 which may be valued at the desired amperage of 2 amps. and 5 amps. The transformer 300 has three secondary windings, each adapted to provide predetermined voltages to the electronic components connected thereto.

The transformer secondary winding 308 supplies the necessary heater voltages for the filaments of the electronic tubes to be described shortly.

The transformer secondary winding 310 supplies the necessary voltage for the weigh belt D.C. motor 68 which forms part of the structure of the weigh conveyor 31. This voltage is passed through a pair of diodes 312 and 314 of a diode rectifier circuit properly connected to give full wave rectification. This rectified voltage is filtered by capacitor 316, the positive side of which is grounded to the chassis. Similarly, the center tap of the transformer secondary winding 310 is grounded to the chassis after passing through a suitably valued fuse 318. The negative line goes from the junction of capacitor 316 to variable resistor 320 to one side of the D.C. motor 68. The resistor 320 is adjustable and is mounted behind the control panel 46 and is employed to adjust the voltage supplied by the secondary windings 310 to a maximum. The line from the other side of the motor 68 goes through the shingle resistor 322 to the belt switch 324 (which is mounted upon the control panel 46) and is then connected to the chassis and consequently grounded. The shingle resistor 322 is variable and is used to vary the voltage supplied to the D.C. motor 68 and thus increase or decrease the motor r.p.m.

A lead 326 is grounded from the junction of resistor 328 of space timer circuitry 329 and terminal 330e of relay 330. Relay 330 is normally a closed switch, the blade of which comes out on terminal 330g. A resistor 332 is connected with terminal 330g, as well as the junction of resistor 334 and capacitor 336. The resistance 334 goes to the grid of the space timer tube 338 which functions as a thyratron. The capacitance 336, on the other hand, is grounded to the chassis. The voltage on this ground line supplies a bias voltage to the electronic tube 338. Another bias voltage is supplied to this electronic tube 338 through resistor 340 which is connected to the tube screen and junction of resistor 328 and resistor 342, the latter being connected to the chassis ground. Since the space timer electronic tube 338 functions as a thyratron, this tube will not conduct with a bias voltage placed on it. The normally open side of the blade of terminal 330g is terminal 330f. From this terminal 330f, a resistor 344 is connected to the chassis ground. The wire 346 extending from terminal 330f is connected to the space-time resistor 348 which in turn is connected to ground. This resistor 348 is variable and is used to adjust the space between the units of bacon or similar meat product 14 coming off of the weigh conveyor 31. This is accomplished by charging capacitor 336 when the switch terminals 330g and 330e are connected. When these terminals are open and terminal 330f and 330g connected, resistors 344 and 348 will then be connected across capacitor 336 and thus short the latter and bleed off the bias voltage from the grid of tube 338. As will be appreciated by those skilled in the art, the more resistance present, the longer will be the time necessary to reduce this voltage to zero. Resistors 332 and 334 are utilized to reduce the initial voltage applied to the grid of tube 338; whereas resistors 340, 328 and 342 function to reduce the screen voltage.

From the junction of resistors 328, 340 and 342, a wire is run to a synchro-switch 350 which is mounted on the back end of the drive shaft for knife blade 16, and additionally protrudes through the belt guard of this drive shaft structure. For a detailed description of such a switch usable with this invention, reference is had to the above-referenced patent. The switch 350 is adjustable for purposes of obtaining the proper thickness on the initial slice on each and every unit of bacon weighed. When this switch 350 closes, which is the case on every complete turn of the knife blade 16, it reduces the screen voltage of tube 338, thus permitting this tube to conduct through resistors 352 and 354 with capacitor 355 functioning as a filter when the solenoid 330j of relay 330 is energized, thus closing the connection between terminals 330c and 330d. These resistors 352 and 354 reduce the voltage supplied to relay 360, which when energized supplies the necessary voltage to the start solenoid 268 of the double solenoid valve assembly 220 as a result of the closing of normally open contacts 360c and 360d.

Additionally, the energization of relay 360 opens the load side of phase detector tube 362 of phase detector circuit 363 as a result of the opening of terminals 360a and 360b which are normally closed. Consequently when the line to the load side of phase detector tube 362 opens, the scale 35 will be permitted to register another package of shingled meat product 14 of the preselected weight.

The secondary windings 370 of transformer 300 supply D.C. voltage through a diode bridge rectifier 372 connected in a voltage doubler circuit and fused at 374 for the desired amperage. One side of the voltage doubler circuit is grounded to the chassis, with the other side connected to a resistance bridge including resistors 376 and 378. A filter 380 is connected at the junction between the diode bridge 372 and resistor 376, and is then extended to the chassis, and consequently ground. Similarly, a capacitor 382 also functioning as a filter, is connected at the junction between resistor 376 and 378 and is then led to ground by means of the chassis. The resistor 378, which is an adjustable resistor, goes to a terminal of a voltage regulator tube 384 and additionally to a resistance network which includes resistors 386, 388 and 390. Further, the adjustable resistor 378 is connected to terminal 392f of coil 392h of the relay 392. The other side of voltage regulator tube 384 is grounded to the chassis.

The resistor 390 is coupled with the oscillator plate of the power amplifier and oscillator tube circuit 394. A capacitor 396 is coupled to the junction of resistor 390 and the plate terminal of the oscillator side 395 of this tube circuit 394, with the other end extending to the grid of the amplifier side 397, thereby functioning to pass the proper number of cycles to the grid of this amplifier 397. A resistor 398 extends from the terminal of this grid to the chassis and functions to maintain the proper D.C. voltage thereon.

The grid terminal of the oscillator 395 has tied thereto capacitors 400 and 402, as well as resistor 404. The capacitor 402 and resistor 404 are grounded to the chassis. Capacitor 400, on the other hand, is connected to the resistor 406 which in turn is coupled with the junction of resistor 408 and capacitor 410. The resistor 408 is then connected to the terminal of the cathode of the oscillator side 395 of the power amplifier and oscillator tube circuit 394. Voltage regulator lamps 412 and 414 are additionally connected to the cathode terminal and to one another with voltage regulator lamp 414 connected to ground. These lamps 412 and 414 function to provide the proper voltage regulation for the oscillator side 395 of the tube circuit 394.

When capacitor 402 discharges once, this pulse will go through the oscillator side 395 of the tube circuit 394, thence through capacitor 396 and the amplifier side 397 of the tube circuit 394 to capacitor 410, which is connected back to the junction of resistor 406 and resistor 408. The generated pulse passes through resistor 406 and capacitor 400 back into the grid of the oscillator side 395 of the tube circuit 394, thereby increasing in pulses until it reaches the proper magnitude.

A step-up transformer 416 has one end of its primary winding 417 connected to the plate of the amplifier side 397 of the tube circuit 394. The other end of this transformer winding extends to the junction of the diode bridge 372, resistor 376 and capacitor 380, thus supplying the voltage output at this junction to the plate of the amplifier side 397 of the tube circuit 394.

The cathode of the amplifier side 397 of the tube circuit 394 has a resistor 418 connected thereto and to the chassis ground and functions as a load-limiting resistor. Capacitors 420 and 422 are coupled with one another as well as the plate terminal of the amplifier side 397 of the tube circuit 394. The other side of capacitor 420 is connected with a resistor 424, the other end of which goes to a pilot light 426, located on the control panel 46, and suitably connected to ground. The capacitor 422 is coupled with the trim switch 428 and consequently when this switch is closed, the output signal from the oscillator side 395 of the tube circuit 394 will be nullified. The secondary of step-up transformer 416 has a center tapped secondary winding 430 extending to the chassis. The ends of this winding 430 supply power to the two differential transformers 432 and 434 and more specifically to their primary windings 433 and 435 which are themselves connected in parallel. Resistor 436 and capacitor 438 are also connected in parallel across the primary windings 433 and 435 respectively of the two differential transformers 432 and 434. Resistor 436 is a variable resistor used to null the transformer circuitry or center the weight control so that it is possible to get as much overweight as underweight.

The differential transformer 434 is mounted on the control panel 46, while the other differential transformer 432 is mounted on the weigh head assembly 296 of scale 35. The capacitor 438 functions to smooth out the signal obtained at this weigh head assembly 296.

The secondaries 442 and 444 of the differential transformers 432 and 434 respectively are connected in series with one side thereof extending to the transformer 450 and then ultimately grounded to the chassis.

Transformer 450 is of the step-up type, with one end of its primary winding 452 coupled with the other side of the series connected secondary windings 442 and 444 of differential transformers 432 and 434, respectively. At this point, a capacitor 440 is coupled and extends to the arm of a variable resistor 436. One side of the secondary windings 454 of step-up transformer 450 is connected to ground by means of the chassis. The other end of the secondary winding 454 goes through resistor 456 to the first stage amplifier 458 of the two-stage amplifier tube circuit 460. A capacitor 462 is coupled with the junction of the secondary winding 454 of step-up transformer 450 and resistor 456, and is extended to ground. Similarly, a capacitor 464 is connected at the terminal of the grid of the first stage amplifier 458 and likewise is extended to the chassis ground. Both of these capacitors 462 and 464 act as filters to smooth out the signal output from step-up transformer 450.

The resistor 466 and capacitor 468 are connected to the cathode terminal of the first stage amplifier 458, with the resistor 466 going to the chassis ground and capacitor 468 connected to the junction of capacitor 470 and resistors 472 and 474. As mentioned in the above, the energy supplied to the plate of first stage amplifier 458 is supplied through the resistor 386. Capacitor 476 extends from the plate terminal of amplifier tube 458 to the junction of resistors 478 and 480. Resistor 478 on one hand is coupled with the chassis ground, whereas resistor 480 extends to the grid of the second stage amplifier 482 and supplies the proper voltage to the grid of this amplifier 482. The cathode terminal of the second stage amplifier 482 has coupled therewith a resistor 484 and capacitor 486 which are suitably connected to the chassis ground. Resistor 484 is employed to limit the amount of current that the second stage amplifier 482 can draw, with capacitor 486 functioning as a filter for this current. A resistor 488 is connected with the plate terminal of the second stage amplifier 482, and additionally, at the other end thereof is coupled with the junction of resistors 388 and 490. As previously described, the resistor 388 is additionally connected to the junction of resistor 390, and resistor 386. The resistor 490, on the other hand, is connected to the chassis ground. The resistors 388 and 490, as well as resistor 488, function to limit the voltage applied to the plate of the second stage amplifier 482. The capacitor 470 extends from the plate terminal of amplifier 482 to the junction of capacitor 468, resistor 472, resistor 474, and the null jack check point 492. Resistor 474 is suitably connected to ground and resistor 472 is coupled with the grid of the detector tube 362, which acts as a thyratron and fires when the applied voltage signals are in proper phase. The null jack check point 492 is a connection for an oscilloscope (not shown) which in turn shows the particular voltage signal at this point. Resistors 472 and 474 act to supply the necessary bias for the grid of the detector tube 362. The resistors 494 and 496 supply the proper bias voltage to the screen of the detector tube 362, with diode 498 functioning to determine what signal goes to this detector screen. Resistor 496 and the diode 498 are both connected to the chassis ground. A capacitor 500 is coupled with the junction of trim switch 428 and resistor 502, with the latter suitably connected to ground and the trim switch 428 mounted on the control panel 46.

When this trim switch 428 is closed, it functions to reduce to zero the bias voltage placed on the screen of detector tube 362 and also the oscillator output signal, as previously mentioned. The cathode terminal of detector tube 362 is grounded to the chassis. The plate terminal of detector tube 362, on the other hand, extends to the terminal 360b of relay 360. The terminal 360b presents the arm of a normally closed switch closing the connection between the terminals 360a and 360b. The relay terminal 360a, which is the other side of this switch, has resistors 504 and 505 coupled therewith. Resistor 504 is connected with the terminal 392g of relay solenoid 392h of relay 392, and functions to reduce voltage. Resistor 505 is a load resistor used to buff out the voltage of the solenoid coil 392h of relay 392 when the switch connecting terminals 360a and 360b of relay 360 is open. The resistance 506 and capacitance 507 circuit serves to prevent arcing between the contact terminals of relay 392. Similarly, the resistance 508 and capacitance 509 network prevents sparking across terminals 360c and 360d of relay 360.

When enough weight has been placed upon the weigh belt 50 of the conveyor 31 and consequently the scale 35, the core piece 515 will pass into the differential transformer 432 and cause a reduction in voltage to approximately zero. If this reduction in voltage goes beyond the zero point, there will be a phase shift and consequently a slight voltage output. This voltage output is amplified and sent to the detector circuit 363 through capacitors 468 and 476 of first stage amplifier 458 of the two-stage amplifier tube circuit 460, and thence to the second stage amplifier 482 and on through the capacitor 470 to the detector tube 362. This being the right phase, both the screen and the grid of the detector tube 362 will be at zero at approximately the same time, thus permitting the detector tube 362 which functions as a thyratron to conduct through contacts 360a and 360b of relay 360 and ultimately energize relay 392.

The proper voltage supply from the house line passes through power on-off switch 510 and energizes dual contacts 392a and 392b and also contact 392c by closing the connection arm between these contacts, when the relay 392 is in its de-energized position. When relay 392 is energized, contact 392c and dual contacts 392d and 392e are energized by means of solenoid 392h, and the house line voltage through power switch 510 passes through dual contacts 392d and 392e through contact 392c to the stop solenoid 272 of the double solenoid valve assembly 220. When the connection between dual contacts 392d and 392e and contact 392c is closed, the solenoid 330j of relay 330 is energized. Contacts 330a and 330b, which are normally open, are closed upon the energization of coil 330j to operate the head lift solenoid 512 which is mounted on base plate 511 and associated with the weigh head assembly 296 (see Figs. 3 and 4). This solenoid 512 is mounted under the scale and is employed to actuate a solenoid arm and bell crank mechanism 513 and thus aid in the scale 35 recovering after it has registered the pre-selected weight and thus increase the measuring cycle of the weigh conveyor 31 and scale 35 to an optimum.

A capacitor 514 is coupled with contact 330b and the terminal for the power lead L-1 and functions to squelch the arcing of the contacts of terminals 330a and 330b. Contacts 330c and 330d, which are normally open, similarly close upon energization of the solenoid coil 330j, thus completing the circuit to relay 360 from the space-time tube 338, which is adapted to function as a thyratron. The connection between contacts 330e and 330g opens when the relay coil 330j is energized and consequently contacts 330f and 330g are closed, thus starting the desired timing action. As stated in the above, when the voltage has been completely drained from capacitor 336 of timer circuit 329 and the synchroswitch 350 makes the desired electrical contact, the thyratron 338 will conduct and energize relay 360, which in turn will energize the start coil 268 of the double solenoid valve assembly 220. As soon as relay 360 is energized, it de-energizes relays 392 and 330 by opening the contacts 360a and 360b and consequently de-energizes itself by the breaking of the contacts between 330c and 330d of relay 330. Thus it will now be apaprent that the power amplifier and oscillator circuit 394 energizes the two differential transformer primaries 433 and 435 of differential transformers 432 and 434.

As previously mentioned, the secondaries 442 and 444 of these transformers are connected in series, whereas the associated primaries are connected in parallel. The differential transformer 432 is mounted on the base plate 511 of the scale 35 with its movable core piece 515 included in the weigh head assembly 296 of the scale 35 and initially connected with a damper assembly 516 (see Figs. 3 and 4). The other differential transformer 434 is mounted on the control panel 46 and is used as a control to make the scale 35 weigh more or less than the marked weight. The output of the secondaries 442 and 444 respectively of transformers 432 and 434 are passed through the step-up transformer 450 and then into the two-stage amplifier circuit 460 to the phase detector circuit 363. Consequently, the core piece 515 of the weigh head assembly 296 of the scale 35 has to positively come to the same place each and every time before the detector tube 362 will conduct and energize relay 392 through the pair of normally closed contacts 360a and 360b of relay 360. When relay 392 is energized, it will in turn energize the stop solenoid 272 of the double solenoid valve assembly 220 and simultaneously therewith energize relay 330. Relay 330 then energizes the head lift solenoid 512 which serves to help the scale recover, thus speeding up the production of the weighing and segregating apparatus 10 and approximately simultaneously therewith energize the timer circuit 329. This timer circuit has a control 348 on the control panel 46. This space control 348 is simply a variable resistance which is connected in parallel with a capacitor 336. Thereby the more resistance afforded by the variable resistor 348, the more time it will take to discharge the capacitor 336. This capacitor 336 holds a bias voltage on the thyratron tube 338. Thus when this capacitor 336 is completely discharged, a bias voltage on the thyratron tube 338 no longer exists. This tube 338 will now be permitted to conduct when the synchronizer switch 350 shorts out the screen bias voltage, thus giving a controlled thickness on the first slice of each bacon belly or unit of meat product 14.

When the thyratron tube 338 conducts, it energizes relay 360 through contacts 330c and 330d of relay 330. When relay 360 energizes, it energizes the start solenoid 268 of the double solenoid valve assembly 220 and simultaneously therewith de-energizes relay 392, thus returning the circuit to its original position.

The electronic chassis 44 of the disclosed scale 35 includes a power amplifier and oscillator circuit 394, two-stage amplifier circuit 460, the phase detector circuit 363, and the timer circuit 329, and is included within the cabinet 30. This chassis has a regulated D.C. supply through the transformer 300 and the various rectifying circuits associated with the secondaries of this transformer. Another D.C. supply is applied to the weigh conveyor motor 68, whose speed is variable by means of the variable resistor 322 that is mounted on the control panel 46 and marked "shingle." The control panel 46, besides having the "shingle" control 322, weight control supplied by differential transformer 434, space control 348, has four switches and a pilot light 426. The pilot light when lit is an indication that the oscillator side 395 of the circuit 394 is working. The power switch 510 shuts off all power to the measuring and segregating apparatus 10. The belt switch 324 shuts off the power to the weigh belt conveyor 31. The scale switch 517 energizes the head lift solenoid 512 provided the power switch 510 is closed. This is so that the machine 10 can be used in a straight line operation. The trim switch or button 428 is adapted to short out the phase detector circuit 363 and enable it to conduct as if the scale 35 had been loaded with the required weight. This switch is used to trim off the lesser grade from a bacon slab or meat product 14.

Obviously, the above described electronic network could be coupled with a D.C. power supply without departing from the spirit of my invention.

*Operation*

My improved apparatus 10 is combined with slicing machine 11 at the discharge end thereof so that the sliced product coming from the slicing machine will be deposited on the weigh conveyor 31. A control switch (not shown) is turned on so as to cause the continuous operation of conveyors 32 and 34. The measuring apparatus, which in the present case is scale 35, is adjusted to measure the desired predetermined quantity of the sliced product to be segregated. In this connection, the differential transformer 434 is suitably adjusted to have the scale 35 register after a predetermined weight has been placed upon the weigh conveyor 31. The power switch 510 and belt switch 324 are closed to respectively operate the measuring and segregating apparatus 10 and weigh belt conveyor 31. The product to be sliced is then placed in the slicing machine and the slicing machine is then set into operation so as to cause the feeding mechanism 15 to feed the product to the rotary slicing blade 16 causing the slices to be deposited on the weigh conveyor 31. In order that the lesser grade of bacon, for example, can be trimmed without initiating the actuation of the scale 35, the trim switch 428 is closed after the first full slice appears on the weigh conveyor 31, and then immediately opened. The slicer feed mechanism 15 will stop operating at such switch closure and the timer circuit 329 actuated. Upon the expiration of the preset time, the operation of the feed mechanism will resume.

The power amplifier and oscillator circuit 394 energizes the differential transformer primaries 433 and 435 which are connected in parallel.

When the desired predetermined quantity of slices have been accumulated on the weigh conveyor 31, an output signal will be induced as a result of the displacement of core piece 515 of differential transformer 432. This signal will be stepped up by transformer 450 and amplified by the two-stage amplifier tube circuit 460. The amplified signal, under normal conditions, will be of the proper phase and, consequently, will permit the thyratron 362 to fire, thereby energizing relay 392. When relay 392 is energized, the stop solenoid 272 of valve 220 is, in turn, energized to arrest the movement of piston 25 in cylinder 24, and consequently the feed mechanism 15 of the slicing machine 11. Relay 330 will similarly be energized upon the energization of relay 392 to operate the head lift solenoid 512 which functions to shift the bell crank mechanism 513. The bell crank mechanism 513 will, accordingly, elevate the weigh head assembly 296 and thus permit the scale 35 to recover after it has registered the preselected weight placed upon the weigh conveyor 31. The energization of relay 330 will actuate the timer circuit 329 and thus start the desired timing action which determines the space between the batches of sliced product. After such predetermined time, and upon the closing of synchronizer switch 350, the thyratron 338 will conduct and energize relay 360, which in turn will energize the start coil 268 of the double solenoid valve assembly 220 to permit the restarting of the feed mechanism 15 of the slicing machine 11. The energization of relay 360 will, at the same time, deenergize relays 392 and 330 and, consequently, result in its own deenergization.

The cycle of operation is continuously repeated until the product to be sliced is entirely consumed. As each predetermined quantity of the sliced product is carried away by the transfer conveyor 32, it is thereby segregated from the other sliced products coming from the slicing machine. An operator will then place each predetermined quantity of the sliced product on the selected cardboard backing and transfer such mounted sliced product to the conveyor 34 so that it may then be transferred to a station at which it is suitably wrapped and packaged.

It will thus be seen that I have provided improved apparatus for measuring and segregating predetermined quantities of sliced products coming from a slicing machine which is flexible and may be readily adjusted; which may be used with different types of food products; which does not interfere with the manual control of the slicing machine to which it is applied; which is relatively simple and sturdy in construction so that it is simple to manufacture, assemble and use and requires a minimum amount of repair; which is arranged so that the slicing operation may be resumed after each cycle of operation without any small scraps of sliced product; and in which the food engaging parts are accessible and can be readily cleaned. Obviously, the other enumerated objects and advantages, among others, are more effectively attained.

Modifications may, of course, be made in the illustrated and described embodiment of my invention without departing from the invention as set forth in the accompanying claims.

I claim:

1. Apparatus for slicing measured amounts of food products and the like comprising a slicing machine having means therein for advancing and slicing said products, an adjustable weighing device having a constantly driven conveying means thereon adjacent said slicing machine, and a transfer conveyor adjacent said weighing device conveying means, said weighing device having operative interconnection with said slicing machine advancing means to stop said advancing means when a desired amount of sliced material has been received on said weighing device and restart said advancing means after it has been interrupted for a sufficient period of time for said desired amount to be conveyed away, effective length adjusting means operatively associated with said weighing device conveying means and separate length adjusting means operatively associated with said transfer conveyor, whereby when the effective length of said weighing device conveying means is adjusted, the length of said transfer conveyor correspondingly adjusted, and the weighing device adjusted, the measured amounts of sliced products may be correspondingly varied.

2. The invention, in accordance with claim 1, wherein said weighing device conveying means includes a support for connecting said conveying means to said weighing device, a drive roll having an axis and being rotatably supported by said support, a driven roll having an axis, a bracket rotatably mounting said driven roll, said bracket being connected with said support, a shiftable idler roll coupled with said support, and said effective length adjusting means being operable to adjust the relative positions of each of said axes for determining the effective length of the path of travel of sliced material on the weighing device conveying means.

3. The invention, in accordance with claim 2, wherein said effective length adjusting means includes a selectable and removable filler connected to said support and said bracket for determining the distance between the axis of said drive roll and the axis of said driven roll and for determining the effective length of the path of travel of the sliced material on the weighing device conveying means.

4. The invention, in accordance with claim 2, wherein said effective length adjusting means includes a pivoting means for said idler roll supported by said support, arm means rotatably mounting said idler roll and coupled with said pivoting means in such a manner that said idler roll is shiftable about said pivoting means, and means engageable with surfaces of said support for locking said idler roll in a predetermined position with respect to said pivoting means.

5. The invention, in accordance with claim 4, wherein said effective length adjusting means further includes a selectable and removable filler connected to said support and said bracket for adjusting the distance between the axis of said drive roll and the axis of said driven roll for determining the effective length of the path of travel of the sliced material on the weighing device conveying means.

6. The invention, in accordance with claim 2, wherein a motor is mounted on said support and in operative connection with said drive roll for constantly driving same.

7. The invention, in accordance with claim 1, wherein said transfer conveyor includes an endless conveying means, a transfer roll supporting the leading end of the endless conveying means adjacent the trailing end of the weighing device conveying means, and said separate length adjusting means being coupled with said transfer roll and being mounted on said weighing device such that the transfer roll can be shifted longitudinally of the transfer conveyor towards and away from the weighing device conveying means to correspondingly adjust the length of said transfer conveyor in response to the adjustment of the effective length of said weighing device conveying means.

8. The invention, in accordance with claim 7, wherein said separate length adjusting means includes a pair of arms pivotally connected with respect to said weighing device and rotatably mounting said transfer roll, a shaft pivotally mounted on said weighing device, a rod pivotally mounted on one of said arms, an eccentric means fixedly mounted on said shaft and pivotally mounting said rod, and said eccentric means being so constructed and arranged to limit the longitudinal shifting of the transfer roll towards the weighing device conveying means.

9. The invention, in accordance with claim 8, wherein said separate length adjusting means further includes releasable stop means for limiting the longitudinal shifting of said transfer roll away from the weighing device conveying means.

(References on following page)

References Cited in the file of this patent

UNITED STATES PATENTS

| | | |
|---|---|---|
| 684,026 | Bell | Oct. 22, 1901 |
| 1,038,588 | Iverson | Sept. 17, 1912 |
| 2,227,683 | Walter | Jan. 7, 1941 |
| 2,718,296 | Johnson | Sept. 20, 1955 |
| 2,744,553 | Folk | May 8, 1956 |
| 2,793,736 | Thomson | May 28, 1957 |
| 2,812,792 | Allbright | Nov. 12, 1957 |

OTHER REFERENCES

"Operating Instructions for ANCO No. 827, Hydra-Matic Bacon Slicer" (revised May 14, 1952), and Photostat of blueprint included therewith, published by the Allbright-Nell Co., 5323 So. Western Blvd., Chicago 9, Ill.

"Shingle and Weigh Bacon Automatically," pages 8 to 10 in The National Provisioner, March 19, 1955.

"Split-Second Robot Weigher," pages 94 and 95 in Food Engineering, October 1955.